United States Patent Office 3,629,316
Patented Dec. 21, 1971

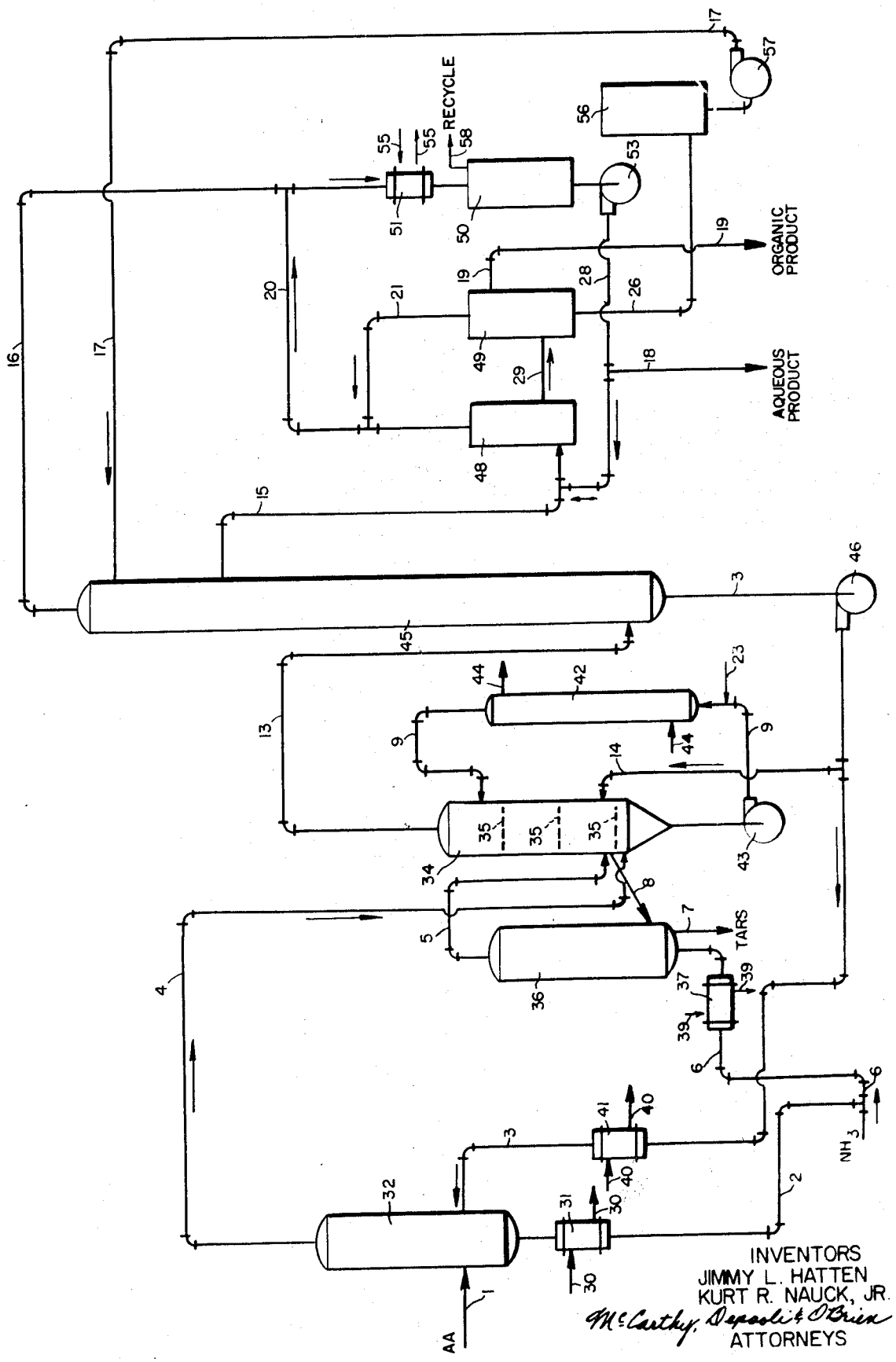

3,629,316
PROCESS FOR THE MANUFACTURE OF
ADIPONITRILE
Jimmy L. Hatten and Kurt Rudolph Nauck, Jr., Odessa, Tex., assignors to El Paso Products Company, Odessa, Tex.
Filed Jan. 22, 1969, Ser. No. 793,044
Int. Cl. C07c *121/10*
U.S. Cl. 260—465.2     12 Claims

ABSTRACT OF THE DISCLOSURE

Continuous process for the production of adiponitrile comprising reacting a mixture of adipic acid and an excess of ammonia in a first stage reactor at a temperature of about 320° to 420° F. in the absence of catalyst, passing the resulting mixture to a perforated tray reactor maintained at a temperature of about 475° to 600° F., in the presence of a dehydration catalyst to form a mixture containing adiponitrile, intermediates, water, ammonia and tars, passing a portion of the mixture from the tray reactor to a purge reactor where it is purged with ammonia at a temperature of about 425° to 525° F. to remove tars with adiponitrile and intermediates being returned to the tray reactor; passing the mixture from the tray reactor to a purification column for removal of adiponitrile product, contacting the product with ammonia and water to convert all adipimide to adipamide, separating the latter from the adiponitrile, recovering the adiponitrile and recycling intermediates, water and ammonia to the system.

BACKGROUND OF THE INVENTION

Field of the invention

The present invention relates to a process for the production of aliphatic dinitriles from aliphatic dibasic acids. More particularly, the present invention relates to a continuous process for the production of adiponitrile from the reaction of adipic acid and ammonia.

DESCRIPTION OF THE PRIOR ART

The production of adiponitrile from adipic acid has assumed importance in the industry as adiponitrile is a valuable intermediate from which hexamethylenediamine can be prepared by hydrogenation, the diamine and the adipic acid forming the basic substances employed in the production of certain types of nylon, for example, nylon 66. For obvious reasons, hexamethylenediamine is the more expensive component used in the preparation of such nylons and it is therefore desirable to reduce the costs of preparing the diamine as much as possible. One significant factor in the expense of producing hexamethylenediamine is the cost of obtaining and purifying the relatively poor grades of adiponitrile which are obtained by procedures now known to the prior art. In the processes now known to the art, the adiponitrile obtained must be subjected to extensive purification procedures prior to hydrogenation to produce the hexamethylenediamine.

It is further known from various prior art, such as U.S. Pats. 2,132,849 and 2,144,340, as well as other patents of later issue, that adiponitrile may be prepared by the reaction of adipic acid and ammonia in the presence of a dehydration catalyst. This reaction would appear to produce good yields of adiponitrile in theory but the practical difficulties in operating the reaction to produce good grade adiponitrile are manifold. This is so because under the conditions of the reaction, a number of by-products are formed which reduce the yields and correspondingly add to the expense of conducting the reaction.

A major problem encountered in the manufacture of adiponitrile employing the known methods and apparatus of the art has been the rather extensive degradation of adipic acid and its reaction products into decomposition products such as those mentioned above as well as additional materials such as cyclopentanone. In addition, other side reactions occur resulting in the formation of by-products such as 2-cyanocyclopentylidene imine (CCPI), adipimide tarry by-products and elemental carbon. Obviously, degradation reactions of these types reduce the yield of the desired product and thus result in an impure product which must be subjected to extensive purification procedures. Furthermore, and more importantly from the standpoint of the practical aspects of running the reaction, the formation of degradation products causes severe problems of plugging of apparatus or conduit lines and build-up of deposits in the reactors of the system.

The latter problems, particularly the carbon build-up and the formation of tars, have been one of the problems which has prevented the discovery of a workable and economically feasible continuous process for the production of adiponitrile by the reaction of ammonia and adipic acid. These problems have not been solved because there has been a failure to understand and thereby work out suitable methods by which the tars may be removed from the system as they are formed in sufficient amounts to prevent build-up while still maintaining a continuous system so that usable products and intermediates can be further converted to desired adiponitrile product and recoverable starting materials can be recovered and recycled through the system to provide a truly continuous operation.

The present invention provides a process which overcomes these several problems of the prior art in providing a truly continuous economical process for the manufacture of adiponitrile from adipic acid and ammonia.

SUMMARY OF THE INVENTION

It is therefore one object of the present invention to provide a continuous method for the production of adiponitrile by the reaction of adipic acid and ammonia.

A further object of the present invention is to provide a novel continuous method in which adiponitrile is produced by the reaction of adipic acid and an excess of ammonia wherein build-up of tars and unwanted products in the system is reduced and partially reacted intermediates are recycled in the system for the production of further adiponitrile which increases the yield and purity of product.

A still further object of the present invention is to provide a novel continuous method for the preparation of adiponitrile from adipic acid with an excess of ammonia in high yields and purity wherein the adiponitrile is obtained in a purity of at least 98 percent.

Further objects and advantages of the present invention will become apparent as the following description thereof proceeds.

In satisfaction of the foregoing objects and advantages, there is provided by the present invention a continuous method for the production of adiponitrile which comprises the continuous steps of contacting molten adipic acid with an excess of ammonia in a prereactor without the presence of catalyst maintained at a temperature of about 320° to 420° F., passing the resulting reaction mixture into a perforated tray reactor and thereinto the presence of a dehydration catalyst, the tray reactor being maintained at a temperature of about 475° to 600° F. to form a mixture comprising adiponitrile, ammonia, water and intermediates resulting from the reaction of adipic acid and ammonia, continuously passing a portion of the mixture from the tray reactor to a purge reactor where it is contacted with additional ammonia at a temperature of about 425° to 525° F. for removal of tars, and passing the resulting gaseous mixture containing mostly adiponitrile and ammonia back to the tray reactor; withdrawing as a vapor the reaction mixture containing adiponitrile, intermediates, water and ammonia from the tray reactor and passing to a purification column operated in such a manner as to remove the adiponitrile product as a side stream, and water of reaction, ammonia and lower boiling by-products overhead, contacting said adiponitrile stream with a portion of the condensed aqueous ammonia stream from the top of the column to convert any adipimide contained therein to adipamide, separating the resulting organic phase containing the adiponitrile and removing from the system, and recycling the aqueous phase containing ammonia, intermediates and water to the system.

Also provided are specific methods for processing the ammonia and water phases for recycle to the system and specific methods for the removal of the adipimide from the adiponitrile product by treatment with the ammonia/water solution to convert the adipimide to adipamide with recycle back to the system for further conversion to additional adiponitrile product.

BRIEF DESCRIPTION OF THE DRAWING

Reference is now made to the drawing accompanying the present invention where there is presented a schematic drawing showing the operation of the continuous process of this invention according to a specific procedure.

DESCRIPTION OF THE PREFERRED EMBODIMENTS

As pointed out above, the present process provides a truly continuous procedure for the production of adiponitrile from the reaction of adipic acid and ammonia. A number of steps are involved in the process and, as indicated above, a series of reactors is employed to insure optimum conversion and recovery of all possible adiponitrile and separation therefrom of intermediates, unwanted tarry materials, water formed during the reaction and excess ammonia, while at the same time recycling recoverable intermediate products, and ammonia which can be further used in the reaction.

It is pointed out that in the continuous process, the individual steps are not independent, as the operating conditions imposed on one will affect the operation of one or more of the others. Therefore, the operating conditions of each is determined only after considering the effects on the entire system.

In the first step of the process, adipic acid is introduced into a prereactor and contacted with ammonia gas, the prereactor being maintained at a temperature of about 320° to 420 F., preferably 340° to 370° F. The ammonia may be preheated to aid in controlling the temperature of the prereactor. Generally the prereactor is under slight pressure of about 20 to 40 p.s.i.a. The prereactor does not contain any catalytic agent such as a dehydration catalyst nor is it maintained at a sufficiently high temperature for the immediate conversion of the adipic acid to adiponitrile. The ammonia is maintained in the reactor in a molar excess of at least three mols of ammonia per mole of adipic acid to minimize losses due to formation of cyclopentanone, and preferably is employed in an excess of about 3:1 to 15:1. Also introduced into the prereactor are recycle intermediates from the purification column. These intermediates are adipamide, cyanopentanoic acid, cyanovaleramide and adiponitrile.

In this first reactor, the adipic acid and ammonia interact to produce a mixture comprising predominantly adipamide, water and ammonia gas. In this first reactor, there may also be formed small portions of intermediates such as adipamic acid and cyanovaleramide, but the major organic product formed is adipamide. As indicated above, no catalyst is present in the prereactor as its purpose is initial conversion of most of the adipic acid before catalyst is utilized for conversion of reactants to adiponitrile in the reactor system. Residence time in the prereactor is about one to three hours.

The recycle stream from the purification column functions as a carrier and as a temperature control element. At lower temperatures, e.g. about 360° F., a portion of the adipamide precipitates from one solution and is carried as a slurry by other liquid products of reaction and the liquid stream recycled from the purification column.

A chemical equilibrium exists in the liquid phase between the various species of intermediate compounds. In this reaction, however, precipitation of the adipamide as a solid, as mentioned above, is advantageous as it removes the desired product from the solution, thereby preventing the liquid phase from reaching a chemical equilibrium or near-equilibrium condition which would reduce or severely limit the desirable reaction of diammonium adipate to adipamide. According to this invention, it has been found that the higher the adipamide content in the feed to the perforated tray reactor, the lower the amount of tars which must be purged from the system. Therefore, it is highly preferable that the total mixture leaving the prereactor have the highest adipamide content possible.

It is also preferable, as mentioned above, that no catalyst components be in the prereactor since the presence of catalyst in the prereactor leads to increased tar formation. Evidence of this fact is quite apparent by a change in prereactor mass color from creamy white with no catalyst to darker shades with catalyst present. Preferred products in this process are not dark in color, but tarry compounds are dark in color.

The hot reaction mixture from the prereactor is then passed to a perforated tray or other reactor providing good contact between the reactants. This reactor therefore provides residence time for the materials to react in producing the adiponitrile and provides efficient contact of the recirculating liquid with ammonia to maintain efficient liquid/vapor mass transfer for the reactants.

This perforated tray reactor is maintained at a temperature of about 475° F. to 600° F. In this tray reactor, the prereactor effluent is admixed with a recirculating stream in the continuous system, and the mixture pumped through an external heat exchanger.

The heat exchanger is utilized to maintain the reacting mixture at the desired temperature level such that the endothermic reaction is maintained in the tray reactor and also to provide sufficient heat for operation of the purification column, discussed hereinafter. Hence, the heat exchanger serves to provide careful regulation of the temperature in the tray reactor at the desired level.

The effluent coming from the heat exchanger is returned to the top of the tray reactor where it is contacted countercurrently with the ammonia stream from the prereactor and purge reactor. The tray reactor thus provides means for vapor-liquid equilibrium and adequate residence time for the reaction. The several trays are to insure proper efficiency for the vapor-liquid transfer of the several compounds involved. It is desirable to obtain complete saturation of the circulating liquid stream as well as of the vapor stream leaving the tray reactor.

With the reacting mixture in the tray reactor, there is introduced a catalytic amount of dehydration catalyst. This catalyst is provided in an amount so as to maintain about 0.1 to about 1.0 percent catalyst in the tray reactor so that a small amount of the catalytic material would be added continuously in the continuous system. This catalyst may be added by passing the catalyst directly into the tray reactor, or into the lines through which the reaction mixture is circulated through the heat exchanger.

A very suitable catalyst for use in the process of this invention is phosphoric acid or phosphoric acid diluted with water which can thus be added easily to the system However, it is of course contemplated that other dehydration catalysts may be used to catalyze this reaction. Catalysts of this type which may be used include compounds of phosphoric acid, such as boron phosphate and oxides of aluminum, silicon, tungsten, titanium, and the like. Also, mixtures of these materials may be employed. As such dehydration catalysts are well known in the art, the use of any particular catalyst is deemed to be within the scope of the present invention.

In this tray reactor, the adipamide, together with any intermediate products formed in the prereactor, and the ammonia react in the presence of the dehydration catalyst to form the adiponitrile and intermediates thereof such as cyanovaleramide, cyanopentanoic acid and adipamide. Adiponitrile and intermediates thereof, in admixture with unreacted ammonia and water formed during the reaction, are then passed as a vapor phase from the tray reactor to a purification column for product recovery.

During the above-described reaction in the tray reactor, a stream of the liquid phase thereof is continuously withdrawn and passed to a purge reactor into which preheated ammonia is introduced, the purge reactor being used to recover and convert intermediates and to withdraw high boiling tars and catalyst from the system. The purge reactor is of sufficient size to provide the time required to convert the useful intermediate compounds to adiponitrile while concentrating the tars in the residue stream. This purge reactor is equipped with an internal heat exchanger to provide heat of reaction and heat of vaporization of the adiponitrile which is stripped out by the incoming ammonia.

The purge reactor is maintained at a temperature of about 425°–525° F. and a stream of ammonia, preheated to approximately the temperature of the reactor, is continuously passed therethrough. As mentioned above, this hot stream of ammonia serves to convert any intermediates present to additional adiponitrile, which is then returned to the tray reactor in a vapor phase with the excess ammonia.

This purge reactor is also of sufficient size to provide a hold-up time of about six to seven hours in order to allow sufficient time for converting a majority of intermediates into adipontrile and to allow a substantial amount of the tars and other high boilers as well as catalyst to be concentrated in the residue stream. The tarry materials, which are very low in useful intermediates, e.g. 10 percent or lower, are removed from the purge reactor and the system. Therefore, the purge reactor is an important component of the system as it provides means whereby useful intermediates are converted to additional product, and tars are removed from the system, the latter thus preventing build-up in the system with resultant clogging of reactors and conduit lines. By this system, the process of the present invention provides a means whereby all the tars can be removed from the system in a stream having a tar concentration of 90–95% as opposed to tar concentration of about 50% by processes of the prior art. This results in tremendous savings in intermediate compounds in addition to providing a clog-free system.

The gaseous phase reaction product from the tray reactor is then forwarded to a purification column for subjection to a distillation operation in which the low boiling gaseous effluent containing primarily ammonia gas, water of reaction, and low boiling intermediates, such as cyclopentanone, are taken from the top of the column whereas the adiponitrile product is withdrawn as a side stream from a point intermediate the column. The higher boiling organic materials containing primarily intermediates, are withdrawn from the bottom of the column and split into two streams or fractions. The first is cooled and returned to the prereactor to act as a carrier for the adipamide crystals formed therein. Since the overall reaction occurring in the prereactor is exothermic, this recycle stream is cooled in order to provide a measure of temperature control. The second fraction is returned to the perforated tray reactor for further conversion of intermediates to adiponitrile.

It should be noted at this point that substantially no catalyst components are contained in the purification column as by the systems operation, all catalyst components are confined to the tray and purge reactors since only a vapor phase is passed to the purification column.

The ammonia/water/volatile by-product mixture is taken off the top of the column at a temperature of about 150° to 175° F. under a pressure of about 15 to 30 p.s.i.a. and is sent to a product recovery procedure in which the mixture is cooled, passed to a hold-up tank and excess liquid phase removed from the system for ammonia recovery. In addition, a portion of the aqueous ammonia is utilized in processing the adiponitrile product as described hereinafter and a portion is returned to the top of the purification column as reflux to help in maintaining the equilibrium in the column and contribute to the continuous operation of the process.

The adiponitrile is removed as a liquid side stream at an intermediate point in the column at a temperature of about 400° to 460° F. This adiponitrile side stream also contains some cyanopentanoic acid, adipamide and adipimide and this is processed in order to convert the adipimide to adipamide which can then be separated from the adiponitrile and the latter can be recovered from the system as a product having at least 98 percent organic purity. This processing is carried out by contacting the adiponitrile with a portion of the cooled ammonia/water mixture taken from the top of the column as described hereinafter.

In this system, any suitable method may be used for maintaining the reflux in the purification column so as to obtain effective separation of the components. One system however, which has been very successful is a technique wherein a portion of the adiponitrile product is continuously taken off and processed so as to be separated from almost all undesirable materials which will remain in the system or will be purged in another waste stream. This is achieved in one embodiment by utilizing two reflux streams. The first stream consists of the overhead aqueous ammonia solution which is refluxed directly back to the top of the column to reduce adiponitrile content of the overhead product. The second stream consists of 100% of the aqueous phase recovered from treating of the adiponitrile side stream. This reflux stream, containing the intermediates recovered in the above-mentioned treatment, is fed to the column at a point between the top reflux and the side stream take-off. The details of controlling such a system to produce desired purity of side stream and overhead product are well-known in the science of distillation and need not be elaborated here. All refluxed organics (higher boilers) are then removed from the bottom of the column and split into two streams with one portion being returned to the perforated tray reactor and the other sent to the prereactor as described above.

The break point of the water and adiponitrile is characterized by a wide temperature range across very few theoretical stages and can be controlled quite conveniently by the reflux to produce an overhead product essentially adiponitrile free and a side stream essentially water-free; however, the separation between adiponitrile and cyanopentanoic acid is much more difficult as the relative volatility is approximately 0.4, adiponitrile being more volatile. In this invention the following scheme was used but it should be understood that the invention is not limited to such a method. At a point near the base of the column a temperature difference between two longitudinal points was sensed. This signal was applied to a controller which automatically adjusted the side stream take-off rate to apply more or less organic reflux and thereby affect the side stream purity. There is nothing particularly novel about the column control and the invention should be in no way limited by the described means or any other means of control. The above method of column control is mentioned only to emphasize the ease with which the existing invention can be operated in a truly continuous manner.

As mentioned above, the side stream containing the adiponitrile is contacted with a portion of the condensed aqueous ammonia stream from the top of the purification column. The procedure involves contacting the liquid aqueous ammonia with hot adiponitrile side stream subsurface in the adipimide reactor. Gaseous ammonia in equilibrium with the reaction mixture is flashed from the aqueous stream by the hot side stream. This vapor is returned to the system for ammonia recycle. The flashing ammonia cools the reaction mixture to the desired temperature.

The adiponitrile side stream and remaining liquid aqueous ammonia are violently mixed by the flashing ammonia in the adipimide extractor. The adipimide extractor supplies the required residence time in order to react the adipimide in the side stream to adipamide, as it is well known that adipimide will react with ammonia to form adipamide. The solubility of adipamide strongly favors the aqueous phase over the adiponitrile phase, thus the reaction/extraction of adipimide/adipamide from adiponitrile is efficiently accomplished in the adipimide extractor.

The quantity of aqueous ammonia and the temperature of the adipimide extractor are variables which are not to be limited in this patent, as both are functions of the quantity of adipimide present in the side stream. However, in the system used results were quite satisfactory at 140° F. and approximately a 1:1 ratio of aqueous ammonia to side stream product. From the adipimide extractor the mixture is sent to a decanter for separation of the two liquid phases. The organic phase, containing the adiponitrile product, is sent to final purification by use of further conventional columns. The aqueous phase containing the extracted intermediate products is recycled to the top of the purification column.

Obviously, continuously returning this aqueous phase to the top of the purification column will cause a buildup of the concentration of these compounds in the adiponitrile side stream until a steady state concentration is reached, that is, the concentration reaches a constant level such that these components are able to pass through the side stream system and return to the column. However, this effect has not been found to cause any operating problems.

It is emphasized that the process of this invention provides a number of advantages in the continuous operation for the production of adiponitrile from adipic acid and ammonia which renders it clearly superior to prior art processes. Thus, in the present invention, high yields of pure adiponitrile product are obtained by a process which can be run continuously over extended periods of time because it provides means whereby formation of tars is reduced by confining catalyst components to the tray reactor and purge reactor, with further means for continuous removal in high concentrations (90–95%) any tarry materials formed. This significantly reduces the loss of valuable intermediates in the tar purge stream. Moreover, a system is provided whereby the troublesome but valuable intermediate adipimide can be continuously converted to adipamide, separated from the adiponitrile product, and returned to the system for conversion to adiponitrile. Finally, the process, by using the concepts outlined above, provides a procedure whereby the overall process can be conducted in a truly continuous manner without clogging of lines and reactors with undesirable materials and with recovery of the product in substantially pure form.

Referring now to the drawing accompanying this application which describes and illustrates a suitable apparatus and preferred embodiment for conducting the process of this invention in a continuous manner, it will be seen that adipic acid (AA) is introduced by metering through line 1 in molten form into the prereactor 32.

The ammonia, which in a continuous operation is partially recycle ammonia, is introduced by line 2 through a flow controller (not shown) and then preheated in preheater 31 (heated by steam line 30) before passing into the base of prereactor 32 at a temperature of about 360° F. and a pressure of about 27 p.s.i.a. In addition, recycle products, described hereinafter, are introduced into the prereactor via line 3 after cooling.

The prereactor 32 is maintained at a temperature of about 320° to 450° F., preferably 340° to 375° F., i.e., about 360° F., without the presence of any catalyst. In this reactor, the ammonia and adipic acid react in the absence of catalyst to form a mixture comprising precipitated adipamide, excess ammonia, water of reaction and small amounts of intermediates and unreacted adipic acid.

This reaction product mixture is passed at a temperature of about 360° F. through line 4 to the perforated tray reactor 34.

Perforated tray reactor 34 is provided with multiple perforated trays 35 which insure proper efficiency for the vapor/liquid transfer of the several compounds involved. The tray reactor 34 is maintained at a temperature of about 475° to 600° F. and at a pressure of about 20–35 p.s.i.a.

The prereactor effluent mixture from stream 4 is introduced into the lower portion of tray reactor 34. The gaseous portion of stream 4 rises through the trays 35 while the liquid phase containing perhaps some precipitated adipamide enters the tray reactor 34 wherein any precipitated adipamide liquefies and forms part of the recycle stream which is passed into line 9 and pumped by pump 43 through heat exchanger 42 where the mixture is reheated by indirect heat exchange with hot oil being passed through heat exchanger 42 through line 44. In this heat exchanger the heat required for reaction and distillation purification is supplied. The temperature of the recycle stream existing about the exchanger is about 525° to 600° F.

As shown in the drawing a dehydration catalyst such as phosphoric acid is introduced into the mixture in line 9 by line 23 just before line 9 enters the heat exchanger. This provides good catalyst contact with the mixture and also provides a convenient means for introduction into the tray reactor. However, the catalyst may also be introduced directly into the tray reactor 34, into line 9 after leaving heat exchanger 42 or into line 4 prior to entering tray reactor 34.

The effluent from heat exchanger 42 is then returned to tray reactor 34 by line 9.

During this reaction in tray reactor 34, a portion of the mixture is continuously bled from the bottom by line 8 into purge reactor 36 for tar removal. Line 8 can be situated anywhere on the recycle loop. The purge reactor is maintained at a temperature of about 425–525° F. and fresh or recycle ammonia is continuously fed therein through line 6 after having been preheated in heater 37 by steam line 39. The ammonia is present in the purge reactor under a pressure of about 20 p.s.i.a. The purge reactor provides hold-up time for further reaction and conversion of intermediates to adiponitrile and accumulation of tarry materials in the bottom, the tarry materials being removed by line 7.

The gaseous effluent from purge reactor 36 consists of ammonia, adiponitrile, and small quantities of vaporized intermediates which are carried back to tray reactor 34 by line 5 for further reaction of intermediates and for ultimate recovery of adiponitrile.

The effluent from tray reactor 34 is passed in the gaseous phase by line 13 to the bottom of purification column 45 for product recovery.

In purification column 45, the bottom portion thereof is at a temperature of about 400° F. to 500° F., this temperature being dependent on other system variables. The purification column 45 generally comprises a distillation column with either packing or trays which allow for good separation of materials and removal of each material. The column is maintained under reflux conditions to achieve good column control and thereby efficient separation of the materials contained in the gaseous phase 13. In purification column 45 the more volatile components comprising unreacted ammonia and water of reaction exit the top of the column through line 16. Simultaneously, adiponitrile product is taken off as a liquid by line 15 from a point intermediate the column as a side stream between the top and middle sections of the column. The higher boiling materials containing unreacted intermediates are taken off at a rate dependent on column reflux from the bottom of the column as shown in the drawing, through line 3. These high boilers are then pumped through line 3 by pump 46 to a point where the stream is split with a portion being returned to the perforated tray reactor 34 by line 14.

The other portion of the high boilers is passed through line 3, cooled by exchanger 41 by coolant circulating through line 40 and then passed into prereactor 32 through line 3 to provide cooling and a slurrying agent for the adipamide formed.

While the purification column control scheme is not novel in the sense that it is claimed as a patent, it is presented in detail here as one scheme by which the system was operated quite successfully on a continuous basis for extended periods of time.

The water/adiponitrile break-point is characterized by an extreme temperature spread (approx. 250° F.) across two or three theoretical stages. Advantage is taken of this system property by controlling this easily detectable point in the column with aqueous reflux. Since all of the aqueous phase from the adipimide extractor is refluxed then control of this break-point is easily established with a portion of the column overhead aqueous ammonia.

At a point sufficiently far below the water/adiponitrile break-point, the adiponitrile side-stream is removed as a liquid essentially water-free. Efficient separation of the adiponitrile from higher-boiling intermediates is accomplished by a differential temperature controller across two or more trays near the base of the column. This controller output operates a valve on the side stream take-off line to effect a change in product flow.

As high-boiling intermediates reach the lower control tray an increase in ΔT is sensed by the controller which begins closing the take-off valve. This action immediately introduces more adiponitrile reflux which forces intermediates back down the column and increases the efficiency of the adiponitrile/intermediate separation.

The overhead stream is taken off the top of column 45 through line 16, passed through a partial condenser 51, the latter being cooled by cold water passed through line 55. This stream is then passed into hold-up tank 50. In the hold-up tank the cooled overhead stream is separated into its equilibrium vapor/liquid fractions. Ammonia gas is recovered for recycle through line 58 to the system.

A portion of the liquid aqueous ammonia mixture from hold-up tank 50 is pumped by pump 53 through line 28 to a point where it is flashed into the hot adiponitrile stream in line 15 and the mixture is passed into adipimide extractor 48. Excess aqueous ammonia is removed from line 28 through line 18 and processed for ammonia recovery from the aqueous solution.

In adipimide extractor 48 the aqueous ammonia solution and adiponitrile product stream are allowed to interact at a temperature of about 125° to 160° F. for a few minutes, i.e. about 5-15 minutes to convert adipimide to adipamide. Ammonia and water vapor, flashed by the high temperature adiponitrile is then recycled to line 16 by line 20. The liquid mixture is then passed through line 29 to decanter 49 where the aqueous and organic phases are allowed to separate. As pointed out any adipimide has now been converted to adipamide by reaction with the ammonia, the adipamide and any 5-cyanopentanoic acid (CPAC) dissolving in the aqueous phase. In the decanter 49 the phases are separated and the adiponitrile is taken off at the top through line 19, taken from the system, and passed to final purification columns for recovery, these final purification columns not being shown in the drawing as they are conventional.

Any gaseous ammonia from decanter 49 is recycled to line 16 by line 21 which merges with line 20. The aqueous stream from decanter 49 is withdrawn from the bottom of the decanter through line 26 and sent to hold-up tank 56 which is level-regulated to recycle all of the aqueous ammonia back to the purfication column through line 17 by pump 57.

It will be understood therefore that by proper control of the amounts of reactants introduced into the prereactor, the amount of tarry by-products taken off from the purge reactor and maintenance of the proper take-off amounts of products and recycled products from purification column, that a completely continuous system can be maintained. In addition, useful intermediates formed during the reaction can be recycled through the system for further reaction to form additional amounts of adiponitrile, and excess ammonia, which is necessarily employed in conducting the reaction, is purified sufficiently to recycle to the system. Water which is formed as a result of the dehydration reaction is taken off and may be discarded except for that utilized in the purification column to maintain the continuous nature of the system.

It will be further understood that various pumps, metering valves, flow controllers, and the like, normally employed in such systems, may be similarly employed in the above-described process to provide optimum results by means known to those skilled in the art. Hence they need not be discussed in further detail here as the operation of such components is well known.

The temperatures, pressures, and other conditions set forth for the various aspects of the reaction are those presently deemed most beneficial to effectively conduct the reaction. However, it is to be understood that such conditions may be varied by means known to those skilled in the art without departing from the spirit of the invention.

While the process of this invention has been described with reference particularly to the drawing accompanying this invention, it is to be understood that other types of reactors may be employed so long as they are effective in providing proper conditions for mass transfer and for enabling the reaction to be carried to completion. Therefore, the process is not to be limited by the particular types of reactors described hereinabove.

The following examples are presented to illustrate specific embodiments of the invention but are not to be considered as limited thereon. In the following examples, parts are by weight unless otherwise indicated.

EXAMPLE I

The following example presents a table in which the flow rates for each stream line are set forth in table form for the operation of a continuous reaction according to use of the apparatus described in the accompanying drawing. In the table, it will be seen that the flow rate per hour is set forth for each stream as it passes through each numbered stream line of the drawing.

In this table, it will be seen that the flow rates, in pounds per hour for each component or stream line, are such as to provide a continuous operation in which all intermediate products are recycled through the system for conversion to adiponitrile and undesirable products are removed from the system. The table also sets forth the temperatures, pressures and volume of the prereactor, perforated tray reactor and purge reactor. Thus the present invention provides an overall advantageous system for the production of adiponitrile from adipic acid and ammonia in a continuous manner.

In this example, the following conditions and volumes were employed.

Prereactor:
 6 gallons
 Temperature—360° F.±10° F.
 Pressure—27 p.s.i.a.
Perforated tray reactor:
 3 gallons—3 perforated plates on 12" spacing
 Temperature—520° F. to 540° F.
 Pressure—20 p.s.i.a.
Purge reactor:
 1.7 gallons
 Temperature—455° F. to 475° F.
 Pressure—20 p.s.i.a.

The foregoing description of the invention has been presented with reference to certain specific embodiments. However, it is to be understood that the invention is not to be considered as limited thereto as various obvious modifications thereof will become obvious to those skilled in the art.

TABLE .—FLOW RATES (POUNDS/HR.)

| Line Number | 1 | 2 | 3 | 4 | 5 | 6 | 7 | 8 | 9 | 13 | 14 | 15 | 16 | 17 | 18 | 19 | 20 | 22 | 23 |
|---|---|---|---|---|---|---|---|---|---|---|---|---|---|---|---|---|---|---|---|
| Component: | | | | | | | | | | | | | | | | | | | |
| Adiponitrile | | | 1.2 | 2.10 | 1.03 | | .01 | .1 | 60 | 13.0 | 1.6 | 10.7 | | 0.5 | | 10.2 | | | |
| Ammonia | 15 | | | 12.0 | 10 | 10 | | | | 21.5 | | | 22.5 | 1.0 | 1.8 | .2 | 1.8 | 19.5 | |
| Water | | | | 3.1 | 0.16 | | | | | 7.3 | | .01 | 15.7 | 8.4 | 5.4 | .9 | 0.2 | 1.0 | .47 |
| Adipic acid | | 5 | | 1.0 | | | | | | | | | | | | | | | |
| Cyanovaleramide | | | 5.2 | 6.0 | 0.15 | | .01 | .77 | 420 | 12.0 | 6.8 | | | | | | | | |
| Cyanopentanoic acid | | | 1.4 | 0.9 | | | | .06 | 36 | 3.5 | 1.8 | 0.1 | | 0.1 | | | | | |
| Adipamide | | | 1.7 | 12.4 | 0.17 | | .04 | .72 | 396 | 4.0 | 2.3 | 0.12 | | 0.23 | | | | | |
| Adipamic acid | | | | 2.0 | | | | | | | | | | | | | | | |
| Cyclopentanone | | | | | | | | | | | | | 0.2 | 0.2 | .03 | .01 | | 0.14 | |
| Adipimide | | | | | | | | | | | | .1 | | | | | | | |
| Cyanocyclopentylimide | | | | | | | | | | | | .05 | | | 0.5 | | | | |
| Tars | | | | | | | .55 | .55 | 300 | | | | | | | | | | |
| Phosphate (as H₃PO₄) | | | | | | | .088 | .088 | 5 | | | | | | | | | | .014 |
| Totals | 15 | 15 | 9.5 | 39.5 | 11.51 | 10 | 0.618 | 2.208 | 1,217 | 61.3 | 12.5 | 11.08 | 38.4 | 10.25 | 7.23 | 11.36 | 2.0 | 20.64 | .484 |

What is claimed is:

1. A continuous process for the manufacture of adiponitrile which comprises the steps of reacting adipic acid with at least three moles of ammonia per mole of adipic acid in a first reactor maintained at a temperature of about 320° to 420° F., and in the absence of catalyts for a time sufficient to produce adipamide passing the resulting reaction products to a second reactor, said second reactor providing sufficient residence time for the materials to react and maintaining liquid/vapor mass transfer for the reactants, said second reactor being maintained at a temperature of about 475° to 600° F., with the presence therein of a catalytic amount of a dehydration catalyst to produce in said second reactor a reaction product containing adiponitrile, ammonia, water and intermediates convertible to adiponitrile under the conditions of the reaction, continuously withdrawing and passing a portion or stream of said reaction product in the liquid phase from said second reactor to a purge vessel maintained at a temperature of about 425° to 525° F., continuously introducing ammonia into said purge vessel, said purge vessel being of such size as to provide sufficient hold-up time for the ammonia to convert the said intermediate compounds essentially to adiponitrile and form a vapor phase comprising essentially adiponitrile and ammonia while concentrating any resultant tars, high boilers, and any catalyst present into a tarry material mixture, withdrawing said terry material mixture from said purge vessel, returning said vapor phase free of said tarry material mixture back to said second reactor, continuously passing a gaseous phase effluent reaction product containing adiponitrile, ammonia and water from said second reactor to a purification column, and removing an adiponitrile product stream from said purification column.

2. A continuous process according to claim 1 wherein about 3 to 15 moles of ammonia are reacted per mole of adipic acid.

3. A process according to claim 2 wherein said adiponitrile product stream from said purification column also contains adipimide, adipamide and cyanopentanoic acid and said stream is contacted with aqueous ammonia at a temperature below about 160° F. to convert the adipimide present to adipamide and the adipamide is recycled to said second reactor.

4. A continuous process for the manufacture of adiponitrile which comprises the steps of reacting adipic acid with at least three moles of ammonia per mole of adipic acid in a first reactor maintained at a temperature of about 320° to 420° F., and in the absence of catalyst for a time sufficient to produce adipamide, passing the resulting reaction products to a second reactor, said second reactor providing sufficient residence time for the materials to react and maintaining liquid/vapor mass transfer for the reactants, said second reactor being maintained at a temperature of about 475° to 600° F., with the presence therein of a catalytic amount of a dehydration catalyst to produce in said second reactor a reaction product containing adiponitrile, ammonia, water and intermediates convertible to adiponitrile under the conditions of the reaction, continuously withdrawing and passing a portion or stream of said reaction product in the liquid phase from said second reactor to a purge vessel maintained at a temperature of about 425° to 525° F., continuously introducing ammonia into said purge vessel, said purge vessel being of such size as to provide sufficient hold-up time for the ammonia to convert said useful intermediate compounds essentially to adiponitrile and form a vapor phase comprising essentially adiponitrile and ammonia while concentrating any resultant tars, high boilers and any catalyst present into a tarry material mixture, withdrawing said tarry material mixture from said purge vessel, returning said vapor phase free of said tarry material mixture back to said second reactor, continuously passing a gaseous phase effluent reaction product containing adiponitrile, ammonia and water from said second reactor to a purification column, removing an adiponitrile product stream from said purification column, contacting said adiponitrile product stream with an aqueous ammonia stream to a temperature below about 160° F. to convert adipimide present into adipamide, separating said adiponitrile product stream as an organic phase from said aqueous ammonia stream containing adipamide, withdrawing any high-boiling organics from said purification column which are not distilled, splitting into streams, recycling a portion to said first reactor and a portion to said second reactor.

5. The process of claim 4 wherein the adipimide in said adiponitrile product stream is converted to adipamide by contacting with an aqueous ammonia mixture which has been withdrawn from said purification column, and wherein a portion of said aqueous ammonia mixture is recycled to said purification column.

6. A process according to claim 5 wherein in said first reactor, the ammonia is maintained in a molar excess of about 3 to 15 moles per mole of adipic acid and said first reactor is operated under a pressure of about 20 to 40 p.s.i.a. and a temperature of about 340° to 375° F.

7. A process according to claim 6 wherein the dehydration catalyst introduced into the second reactor is introduced in an amount so as to maintain a concentration of .1 to 1.0 weight percent based on the weight of the reacting mixture.

8. A process according to claim 7 wherein said catalyst is selected from the group consisting of phosphoric acid, compounds of phosphoric acid, oxides of aluminum, silicon, tungsten, and titanium, and mixtures thereof.

9. A process according to claim 8 wherein said second reactor is maintained at a temperature of about 475° to 600° F. through direct heat exchange by continuously passing a portion of the reacting mixture through an external heat exchanger and recycling to said second reactor.

10. A process according to claim 9 wherein said purge reactor is maintained at a temperature of about 455° F. with a hold-up time in the purge reactor of about six to seven hours.

11. A process according to claim 10 wherein said adiponitrile product stream is removed from said purification column at a temperature of about 400° to 460° F.

12. A process according to claim 11 wherein said second reactor is a tray reactor containing multiple perforated trays.

References Cited
UNITED STATES PATENTS

| | | | |
|---|---|---|---|
| 2,132,849 | 10/1938 | Greenewalt et al. | 260—465.2 |
| 2,144,340 | 1/1939 | Lazier | 260—465.2 |
| 3,117,155 | 1/1964 | Chapman | 260—465.2 |
| 3,299,116 | 1/1967 | Romani et al. | 260—465.2 |
| 3,481,969 | 12/1969 | Corsepius et al. | 260—465.2 |

JOSEPH PAUL BRUST, Primary Examiner